Sept. 3, 1968 R. J. GREENLER ET AL 3,399,985
GLASS MAKING APPARATUS WITH GREATER TRANSVERSE HEAT CONDUCTION
Filed Oct. 19, 1965

INVENTORS
ROBERT J. GREENLER
EUGENE H. AUGUSTIN
BY
P. F. Hilden
ATTORNEY

United States Patent Office 3,399,985
Patented Sept. 3, 1968

3,399,985
GLASS MAKING APPARATUS WITH GREATER
TRANSVERSE HEAT CONDUCTION
Robert J. Greenler, Nashville, Tenn., and Eugene H. Augustin, Dearborn Heights, Mich., assignors to Ford Motor Company, Dearborn, Mich., a corporation of Delaware
Filed Oct. 19, 1965, Ser. No. 497,615
4 Claims. (Cl. 65—374)

ABSTRACT OF THE DISCLOSURE

A tank for the manufacture of flat glass by the float process has a metal containing cavity therein defined by a plurality of refractory ceramic blocks. Molten metal is received in the cavity. A liner is provided in the metal bath to line the cavity formed by the refractory. The liner is constructed so that it conducts heat across the width of the bath at a greater rate than it conducts heat along the length of the bath.

---

This invention relates to the manufacture of flat glass by the so-called "float" process, wherein the glass is formed on the surface of a molten bath to obtain a glass ribbon having true parallelism of its opposite faces and a lustrous, fire-polished surface finish.

The "float" process involves forming or floating a sheet or ribbon of glass on the surface of a molten bath of a metal or salt which has a greater density than that of glass, preferably tin, with or without small amounts of alloying elements. By more or less conventional means, molten glass is delivered at a uniform rate to the bath to form a ribbon which is advanced along the surface of the bath under thermal conditions which permit the ribbon to harden sufficiently to be removed at the end of the bath without harming the surface of the ribbon.

The bath is contained within an enclosed tank structure which comprises lower and upper refractory sections joined together except for restricted entrance and exit passageways through which molten glass is fed to and the glass ribbon removed from the tank structure. The lower refractory section contains the molten metal bath. The space above the metal bath contains a protective gas preventing oxidation of the bath.

It has been found to be advantageous to line the lower refractory section with slabs of graphite and to maintain reducing conditions on the tin at all times to avoid oxidation. It has also been found advantageous to maintain the depth of the bath relatively shallow to reduce convection currents in the tin. Provision of the graphite liner prevents sticking of the hot glass ribbon to the liner in the event that the ribbon should buckle and fold backwardly upon itself while in a softened condition and supported on the surface of the bath.

The process requires a reduction in temperature of several hundred degrees along the length of the bath. It is desirable, however, to maintain a temperature as uniform as possible across the width of the bath so as to maintain the ribbon at uniform temperature across its width at all times.

According to the present invention, the lining for the lower refractory section is formed of extruded graphite positioned with the direction of extrusion extending transversely of the tank so as to facilitate the transmission of heat transversely of the ribbon and reduce transmission of heat longitudinally of the ribbon, extruded graphite having the property of transmitting heat better in one direction than in the other due to orientation of graphitic crystals.

Among the objects of the present invention are to provide an improved apparatus for the manufacture of float glass in which the temperature across the glass ribbon is equalized to a greater degree; to provide such an apparatus in which the temperature equalization is provided by the orientation of blocks forming the lining of the float tank; and generally to improve apparatus of the type described.

Other objects and objects relating to details of construction and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

Figure 1:
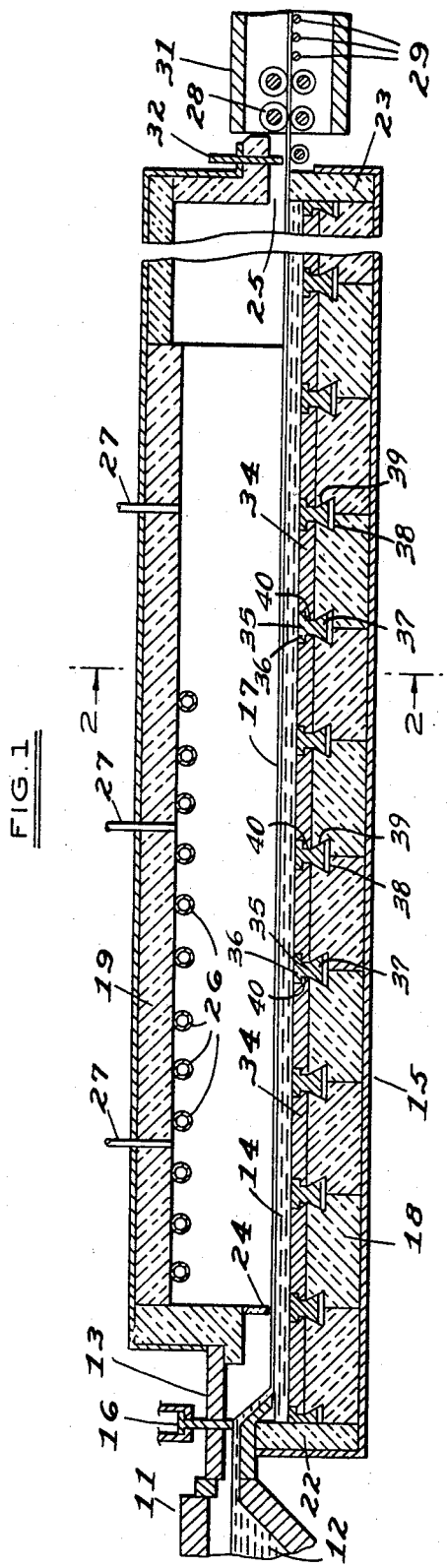
FIGURE 1 is a somewhat diagrammatic vertical longitudinal section through a tank or chamber for the manufacture of float glass, a portion of the forehearth of a glass furnace and the entrance portion of an annealing lehr being shown.
Figure 2:
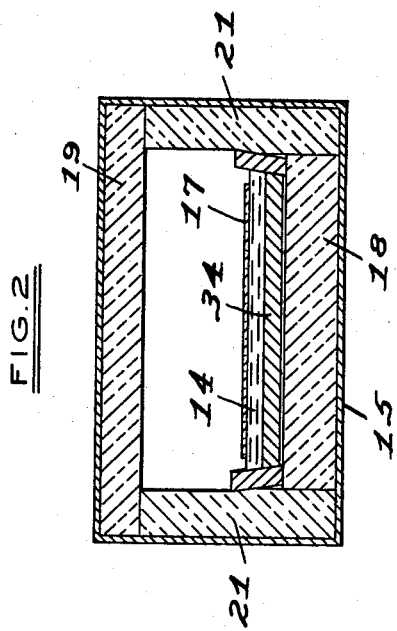
FIGURE 2 is a transverse cross section of the float tank, taken generally along the lines 2—2 of FIGURE 1.

Referring now to the drawings, FIGURE 1 shows the delivery end of a conventional glass melting furnace 11 in which a constant level of glass 12 is maintained. The molten glass 12 is delivered through a forehearth 13 onto the surface of a bath 14 of molten metal or salt contained within a tank structure 15. A gate 16 controls the rate of flow of glass 12 from the furnace 11. The molten bath 14 has a density greater than that of the glass 12 so that the glass will float on the surface of the bath 14. By delivering molten glass at a constant rate and withdrawing the continuous sheet thus formed at a constant rate, a continuous glass ribbon of uniform width is produced. Preferably, the bath 14 is a pool of molten tin, including its alloys.

The tank structure 15 comprises a lower refractory section 18, an upper refractory section 19, sidewalls 21 and end walls 22 and 23 joined together to provide a substantially enclosed chamber except for a restricted entrance 24 and exit 25. The sidewalls 21 and end walls 22 and 23 project above the top surface of the lower refractory 18 to define a container for the molten bath 14.

To maintain the tin in a molten condition and the glass ribbon 17 at the proper temperatures required to form a ribbon of good optical quality, thermal regulation means such as electrical heaters 26 are installed in the roof of the tank structure 15. Heaters or electrodes (not shown) may also be installed in the bath 14 if desired. Cooling means also may be provided to assure that the glass ribbon 17 will be sufficiently cooled and hardened to be removed through the exit 25 without damage to the ribbon. The heaters 26 are connected to a conventional power source and may be individually controlled to provide the desired thermal gradient between the various zones of the tank structure 15 to obtain the desired rate of cooling of the ribbon 17.

Preferably, the glass 12 is introduced into the tank structure 15 at a temperature of about 1850° F. and the glass ribbon 17 is progressively cooled to a temperature of about 1100° F. at the exit 25.

A gas is introduced into the chamber through conduits 27 to provide a protective atmosphere and avoid oxidation of the bath. The gas should be inert or reducing to the components of the bath. Gases such as nitrogen and/or hydrogen have been used for this purpose.

The cooled glass ribbon 17 is withdrawn by driven traction rolls 28 onto a conveyor 29 to enter an annealing lehr 31 where the ribbon 17 is further cooled under controlled conditions to remove or reduce residual stresses therein.

The exit 25 of the tank structure may be provided with a sealing arrangement 32 to retain the protective gas in and prevent the entrance of outside atmosphere to the chamber.

As described in Basler et al. U.S. patent application S.N. 409,664, filed Nov. 9, 1964, now abandoned, the entire lower refractory section 18 and preferably also the upper refractory section 19 and the walls are lined with slabs of graphite. At least for the lining of the lower refractory section 18, the graphite is formed of blocks or slabs 34 in which the graphite crystals are oriented in a direction transversely of the tank structure. Such graphite may be produced in various ways and one common method of production is by extrusion, the crystals being at least partially oriented in the direction of extrusion. A graphite of this type is produced by Union Carbide Corporation.

A property of graphite having its crystals oriented at least partially in a particular direction is improved heat transmission in the direction of extrusion of the crystals and lessened heat transmission across the grain of the crystals (at right angles to the direction of extrusion), the crystal grain extending parallel to the direction of extrusion of the graphite. This difference in thermoconductivity is at least 20 percent and under certain circumstances may be greater.

As shown in FIGURE 1 each slab 34 is held in positon by a transversely extending anchoring or hold-down means such as a key 35 which may also be made of graphite and which engages the two opposite transversely extending sides of each slab 34. The key 35, which extends across the width of the bath, has an upper T-shaped portion 36 and a lower tenon part 37. The lower refractory 18 has transversely extending keyways 38 in the form of mortises 39 interlockingly receiving the tenon parts 37 of the keys 35 to effect dovetail connections therebetween. The mortise 39 in the lower refractory 18 is slightly greater in depth than the length of the tenon part 37 so as to provide clearance between the key 35 and the keyway 38. The transversely extending sides of each slab 34 have stepped portions 40 to engage the side of the T-shaped part 36 of the keys 35.

The heat loss at the sides of the tank structure 15 is substantially greater than along the center line of the bath, due to the uncovered surface of the molten metal and, particularly, the loss of heat through the sidewalls of the chamber. Inasmuch as it is desirable to obtain a lateral flow of the molten glass in a short longitudinal distance, it is important to maintain a uniform temperature across the width of the bath. Moreover, the uniform temperature across the bath and across the ribbon is required to obtain a glass sheet of uniform thickness across its width and to permit uniform attenuation of the ribbon without creating optical distortion due to minor variations in thickness, which will occur if there is not completely uniform viscosity and thickness across the ribbon before stretching. Orientation of the graphite slabs 34 as above described tends to more rapidly conduct heat from the center to the sides of the bath to obtain a more nearly uniform temperature across the width of the bath and across the width of the ribbon.

At the same time, it is desirable to reduce heat conduction longitudinally of the chamber. The glass, when entering the chamber, is at a temperature of approximately 1850° F. and when exiting is about 1200° F. This requires a temperature drop along the length of the chamber 15, requiring that an initial portion of the chamber be maintined hot enough to permit the glass to flow freely while the exit end of the chamber must be cool enough to permit the glass to be withdrawn from the chamber without damaging its surface. By orienting the graphite slabs 34 as above described, the heat transmission along the length of the chamber is reduced, thereby facilitating the maintenance of different temperatures along the length of the chamber.

We claim:
1. A tank for the manufacture of flat glass by a float process which comprises: a plurality of refractory ceramic blocks forming a refractory ceramic lining with a cavity therein for receiving and supporting a molten metal bath therewithin; molten metal received in said cavity and forming said molten metal bath upon which molten glass may be poured and processed so as to form a glass ribbon; means extending transversely of the tank for conducting heat across the width of the bath at a greater rate than along the length of the bath; and means for mounting said conducting means in said molten metal bath to line said cavity formed by said refractory.

2. The tank for the manufacture of flat glass by a float process as defined in claim 1 wherein said conducting means is formed of graphite slabs in spaced relationship having its crystals oriented principally in one direction, and wherein said mounting means positions said graphite in said metal bath with said oriented crystals aligned in the transverse direction.

3. The tank for the manufacture of flat glass by a float process as defined in claim 2 wherein said graphite is extruded graphite.

4. A tank for the manufacture of flat glass by a float process which comprises: a plurality of refractory ceramic blocks forming a refractory ceramic lining with a cavity therein for receiving and supporting a molten metal bath therewithin; molten metal received in said cavity and forming said molten metal bath upon which molten glass may be poured and processed so as to form a glass ribbon; slab means positioned in spaced relationship extending transversely of the tank for conducting heat across the width of the bath at a rate at least 20% greater than along the length of the bath; and means for mounting said slab means in said molten metal bath to line said cavity formed by said refractory.

References Cited
UNITED STATES PATENTS 3,266,880 8/1966 Pickington _____ 65—374
3,332,763 7/1967 Basler et al.

DONALL H. SYLVESTER, *Primary Examiner.*

E. R. FREEDMAN, *Assistant Examiner.*